Aug. 8, 1967 A. J. JEWELL ET AL 3,335,263
TEMPERATURE CONTROL EQUIPMENT
Filed Dec. 8, 1964

Inventors
ANTHONY J. JEWELL
COLIN H. L. GOODMAN
By *Percy P. Lantz*
Attorney 3,335,263
TEMPERATURE CONTROL EQUIPMENT
Anthony John Jewell and Colin Howard Ludlow Goodman, Aldwych, London, England, assignors to International Standard Electric Corporation, New York, N.Y., a corporation of Delaware
Filed Dec. 8, 1964, Ser. No. 416,779
Claims priority, application Great Britain, Jan. 3, 1964, 355/64
2 Claims. (Cl. 219—497)

ABSTRACT OF THE DISCLOSURE

Equipment for deriving an error signal expressive of the departure of a temperature quantity from its desired level, and for using said error signal to correct the temperature quantity. An alternating wave is impressed upon the error signal, which is also augmented by the addition of a D-C component determined by variation of power-supply voltage. Combined signal is fed back to control temperature quantity.

---

This invention relates to temperature control equipment.

According to the invention there is provided temperature control equipment including first means for responding to any departure of a temperature-indicative electrical signal from a level corresponding to that of a desired temperature so as to correct for any said departure, second means for superimposing on said signal a further electrical signal periodically varied symmetrically about said level, and third means for superimposing on said further signal an additional electrical signal so as to alter said level.

Figure 1:
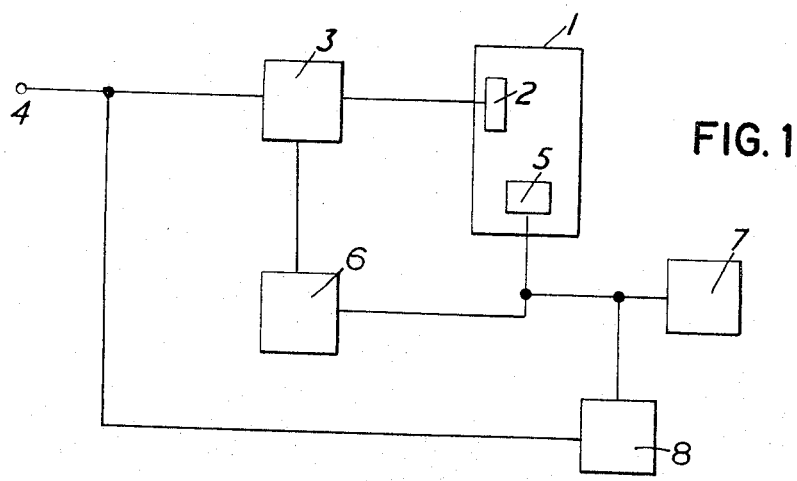
Figure 2:
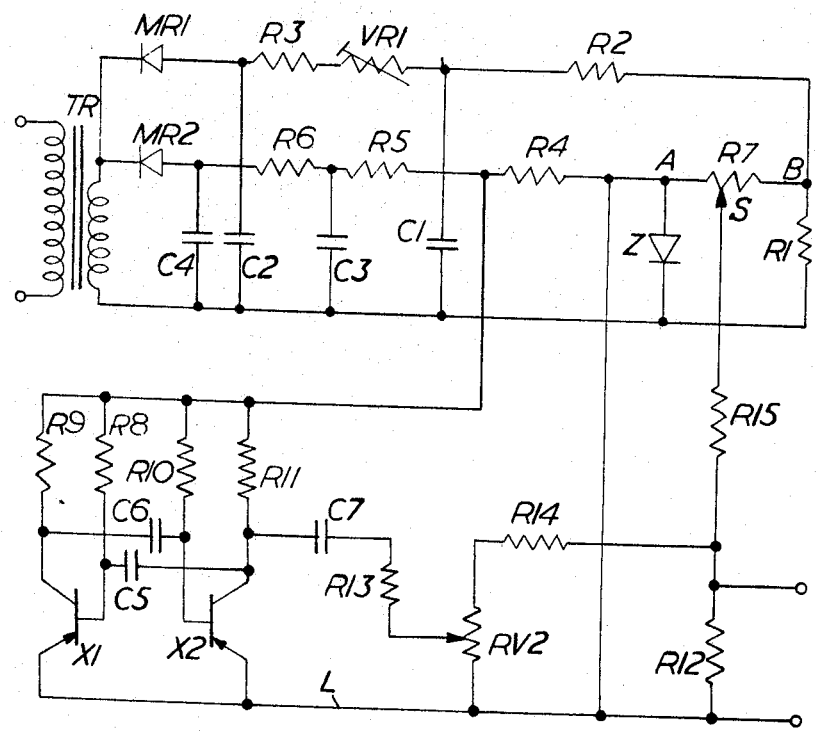

An embodiment of the invention will now be described with reference to the accompanying drawings, in which:

FIG. 1 is a block schematic diagram of an electrically heated furnace temperature control system embodying the invention; and FIG. 2 is a circuit diagram of part of the temperature control equipment of FIG. 1.

Referring to FIG. 1, a furnace 1 has an electrical heater 2 supplied via a regulator 3 from an unstabilized supply (not shown) connected to terminal 4. Such a supply will typically be the electricity mains supply.

A temperature sensitive device 5, such as a thermo-couple, situated within the furnace 1, delivers an electrical signal, indicative of the temperature of the furnace, to an on-off contacting voltmeter 6, whose contacts control the operation of the regulator 3.

This well-known feedback control system is one of the simplest and most widely used forms of temperature control, in which the power supplied to the furnace is held at a maximum value (one sufficient to take the furnace to a higher temperature than is required) until the voltage output from the thermocouple exceeds that set on the voltmeter. A contacting arrangement then reduces the power and, after an initial overshoot, the furnace commences to cool. Maximum power is restored when the thermocouple output falls below the set value.

On account of thermal inertia, and other effects such as pivot friction in the voltmeter, the temperature control characteristic shows a "dead zone" about the control point within which the temperature cycles with a period which is measured in minutes. The period varies in proportion to the size of the furnace.

The sensitivity of the temperature control is improved by effecting a periodic modulation of the output of the temperature sensitive device; this was first suggested by Gouy in 1897.

Modulation of this kind can readily be incorporated in the system by a modulator 7 applying an alternating voltage of sufficient amplitude to sweep the voltmeter pointer over, say, 5% of the scale in series with the thermocouple output. The sweep period must be short compared with the thermal time constant associated with the "dead zone."

The modulation swing leads to power being reduced before the set temperature is reached by the furnace. This is because the voltmeter contacts open as soon as an indicator set temperature is reached. As a result the rate of increase in true temperature is reduced progressively, and after a slight overshoot, the furnace settles down at the required temperature without any of the "dead-zone" cycling previously referred to.

Modulation effectively imparts a proportioning action to the control, power being adjusted in such a way that there is a restoring action towards the set temperature proportional to departures from it. Such porportional action is only effective provided that the true temperature remains within the proportional band, that is, the range of temperature above and below the set temperature swept out by the modulated pointer. This requirement determines a minimum modulation amplitude which is set by the chance temperature fluctuations encountered with a given furnace installation, and which must be established empirically. A larger value than this must be insured or else the advantages of proportional control will be lost.

It is to be noted that this proportional control is achieved by varying the ratio of "on-time" to "off-time" of the furnace. For optimum control these two times should be equal, which implies that the rate of heating with full power and the rate of cooling with reduced power should be equal also.

It is also to be noted that the proportional action becomes increasingly sensitive as the proportional band is reduced. This is because a given change in true temperature has a much greater effect on the ratio of on-time to off-time when the proportional band is narrow than when it is wide. Accordingly, subject to the limitation set by chance temperature fluctuations mentioned earlier, the smallest possible modulation amplitude should be used.

The modulation period should be short compared with the thermal time constant of the furnace-thermocouple system; it is obviously undesirable that there should be any appreciable heating or cooling during the on and off periods of the modulating cycle. A useful indication of the thermal time constant of an installation can be obtained from the dead zone cycling time with the modulator inoperative. The modulator cycle time is conveniently chosen to be less than 10% of this.

Fluctuations in the mains supply voltage can affect control accuracy. If, the example, the supply voltage rises above its nominal value, the power supplied to the heater 2 will increase with a resulting rise in furnace temperature.

Since, as already stated, the amplitude of the impressed modulation voltage is such that the proportional band is as narrow as possible consistent with effective proportional control, fluctuations in mains supply voltage will tend to alter the furnace temperature so that it no longer remains within the proportional band, and proportional control will be lost.

In order to correct for any such mains supply fluctuations, a comparator 8 is provided which compares the supply voltage with a reference voltage and which impresses a D.C. error signal on the output of the modulator 7 if there is any departure of the mains voltage from its nominal value. This error signal alters the indicated temperature in a sense to compensate for the supply voltage change, and has the effect of bodily shifting the proportional band so that the indicated furnace temperature remains within the proportional band.

A circuit diagram of the comparator 8 and the modulator 7 is shown in FIG. 2.

The comparator comprises a transformer TR whose primary winding is connected across the mains supply to the furnace. The mains input is stepped down to a suitable voltage, for example 24 volts, and two D.C. supplies are derived from it.

One supply is unstabilized and includes a load resistance R1, a resistance R2, a filter comprising a capacitor C1, a resistance R3 and a variable resistance VR1, reservoir capacitor C2 and a rectifier MR1.

The other supply is stabilized and includes a Zener diode Z for the stabilization, a resistance R4, a resistance R5, a filter comprising a capacitor C3 and a resistance R6, a reservoir capacitor C4 and a rectifier MR2.

An error signal load resistance R7 is connected between points A and B in the stabilized and unstabilized circuits respectively. The variable resistance VR1 is adjusted so that with the mains supply at its nominal value, the voltage at point B is equal to the voltage at point A.

Any departure of the mains voltage from its nominal value causes a change in the voltage at point B. A proportion of the resulting current flowing through the resistance R7 is tapped off by a suitable setting of slider S to constitute the D.C. error signal.

The modulator comprises a symmetrical transistor astable multivibrator powered by the voltage drop across resistance R4, for example 3 volts, although the multivibrator could be powered by a separate supply, for example a battery.

The multivibrator includes transistors X1 and X2 having base and collector biasing resistances R8, R9 and R10, R11 respectively. The collector of X1 is connected via a capacitor C6 to the base of X2, and the collector of X2 is connected via a capacitor C5 to the base of X1.

The output of the multivibrator is taken between the collector of X2 and a supply lead L, and is applied across a resistive impedance R12 of low value, for example 10 ohms, R12 being in series with the thermo-couple output circuit.

The multivibrator output is passed via a series capacitor C7 to eliminate any D.C. component and a series resistance R13 which is of high value, for example 22KΩ, relative to resistance R12 to a variable resistance RV2 which is set according to the modulation amplitude necessary to swing the output voltage of the modulator over the required range as already described. The required output is passed via a resistance R14, and superimposed on the thermo-couple output voltage.

Any D.C. error signal from the resistance R7 is passed via a resistance R15, which is of high value, for example 10KΩ, relative to the resistance R12, to correct for any departure in mains supply voltage. Thus, if the mains voltage increases, the D.C. error signal is negative, and vice versa.

Resistance R13 and R15 are of high value to prevent any interaction between the modulator circuit and the compensating circuit.

The reference voltage at point A could of course be provided by a battery instead of stabilizing a mains-derived voltage.

The superimposing of the modulated voltage and the error correcting voltage for mains fluctuation may also be performed on the signal derived from other forms of temperature sensitive device delivering a corresponding electrical output, such as a thermistor; moreover, other forms of supply controlling devices can be used instead of the described on-off contacting voltmeter.

What we claim is:

1. Electrically-heated-furnace temperature control system having an unstabilized source of electrical heater power supply, said system including a thermocouple device arranged to deliver a voltage indicative of the temperature of the furnace, an on-off contacting voltmeter connected across the output of said thermocouple device in a circuit including a resistive impedance, a transistor astable multivibrator having its output connected across said resistive impedance so as to superimpose on the output voltage of said thermocouple a voltage which is periodically amplitude modulated over a range in excess of the voltage modulation required to operate the on-off contacts of said voltmeter, and a compensating circuit for responding to any departure of the voltage of said power supply source from its nominal value to cause a D.C. voltage to be superimposed on said output voltage so as to compensate for said departure.

2. Temperature-control equipment including means for detecting the departure of a temperature-indicative electrical signal from a level corresponding to that of a desired temperature; modulating means for impressing on said signal a periodic symmetrical electrical wave; means for superimposing upon the combination of said signal and said wave a further electrical signal which is a measure of power-supply voltage thereby to form a composite control signal, said last-named means including a stabilized voltage supply, an unstabilized voltage supply, means for setting the nominal level of said unstabilized voltage supply to equal that of said stabilized voltage supply, and means for deriving said further electrical signal as a measure of the departure of the level of said unstabilized voltage supply from the level of said stabilized voltage supply; and means for feeding back said composite control signal to the input terminals of said temperature-control equipment.

References Cited

UNITED STATES PATENTS

| | | | |
|---|---|---|---|
| 2,994,759 | 8/1961 | Lipman | 219—501 |
| 3,131,545 | 5/1964 | Gross et al. | 219—497 |
| 3,180,974 | 4/1965 | Darling | 219—501 |
| 3,231,719 | 1/1966 | De Viney et al. | 219—501 |

RICHARD M. WOOD, *Primary Examiner.*

ANTHONY BARTIS, *Examiner.*

L. H. BENDER, *Assistant Examiner.*